United States Patent [19]
Erath

[11] Patent Number: 5,815,466
[45] Date of Patent: Sep. 29, 1998

[54] HYDROPHONE STRUCTURE WITH REVERSE BEND OF PIEZOELECTRIC ELEMENT

[75] Inventor: Louis W. Erath, Abbeville, La.

[73] Assignee: Syntron, Inc., Houston, Tex.

[21] Appl. No.: 811,103

[22] Filed: Mar. 3, 1997

Related U.S. Application Data

[63] Continuation-in-part of Ser. No. 579,327, Dec. 27, 1995, Pat. No. 5,677,894.

[51] Int. Cl.⁶ .................................................. H04K 17/00
[52] U.S. Cl. ......................... 367/160; 367/157; 310/331; 310/345; 310/337
[58] Field of Search ..................... 367/155, 157, 367/160, 161, 165; 310/331, 337, 345

[56] References Cited

U.S. PATENT DOCUMENTS

| | | | |
|---|---|---|---|
| 3,187,300 | 6/1965 | Brate | 340/10 |
| 3,749,948 | 7/1973 | Morris | 310/9.4 |
| 3,988,620 | 10/1976 | McDavid | 310/8.6 |
| 4,017,824 | 4/1977 | Fife et al. | 340/10 |
| 4,174,503 | 11/1979 | Merklinger et al. | 330/300 |
| 4,446,544 | 5/1984 | Connolly, Jr. | 367/155 |
| 4,464,739 | 8/1984 | Moorcroft | 367/130 |
| 4,509,037 | 4/1985 | Harris | 340/347 |
| 4,709,361 | 11/1987 | Dahlstrom et al. | 367/165 |
| 4,782,910 | 11/1988 | Sims | 181/106 |
| 4,799,201 | 1/1989 | Nelson | 367/41 |
| 4,833,659 | 5/1989 | Geil et al. | 367/155 |
| 4,841,494 | 6/1989 | Banno | 367/157 |
| 4,876,675 | 10/1989 | Ogura et al. | 367/155 |
| 4,926,397 | 5/1990 | Robertson | 367/157 |
| 4,977,546 | 12/1990 | Flatley et al. | 367/140 |
| 5,029,147 | 7/1991 | Andrews et al. | 367/134 |
| 5,051,799 | 9/1991 | Paul et al. | 375/25 |
| 5,193,077 | 3/1993 | Weiglein et al. | 367/23 |
| 5,335,548 | 8/1994 | Kalibjian | 73/655 |
| 5,363,344 | 11/1994 | Sofen | 367/157 |
| 5,394,379 | 2/1995 | Weichart et al. | 367/163 |
| 5,541,894 | 7/1996 | Erath | 367/157 |

OTHER PUBLICATIONS

Piezotronic Technical Data, Brush Electronics Company, 1952, pp. 1–27.
Material Descriptions and Typical Applications, pp. 12–13.
IEEE Standard on Piezoelectricity, Copyright 1978 by The Institute of Electrical and Electronics, Engineers, Inc., pp. 1–55.

*Primary Examiner*—Ian J. Lobo
*Attorney, Agent, or Firm*—Gunn & Associates, P.C.

[57] ABSTRACT

An active element in a hydrophone includes a piezoelectric hydrophone crystal mounted to a backing plate. The piezoelectric crystal may be divided into separate segments. If so segmented, the polarities of the segments are oriented in the same direction. Whether or not segmented, the center portion or segment of the crystal is in abutting contact with a motion limiter, which acts as a spring between the piezoelectric crystal and the casing surrounding the crystal and backing plate. The portions or segments or the crystal are connected to electrical signal leads with the minimum amount of solder necessary to ensure secure electrical and mechanical coupling, thereby reducing the effects of the solder connection on the stress flux profile in regions of the crystal close to the solder.

14 Claims, 3 Drawing Sheets

HYDROPHONE STRUCTURE WITH REVERSE BEND OF PIEZOELECTRIC ELEMENT

This is a continuation-in-part of U.S. application Ser. No. 08/579,327 entitled Hydrophone Structure With Center Pin, field Dec. 27, 1995, now U.S. Pat. No. 5,677,894.

FIELD OF THE INVENTION

The present invention relates generally to the field of hydrophones and, more particularly, to a new hydrophone and to a method and system for mounting a low-distortion hydrophone element in which one portion of a piezoelectric crystal is flexed in one direction and another portion of the same or another crystal is flexed in the opposite direction to cause a reverse polarity signal from the crystals. Reverse flexure of the portions of the same crystal or reverse flexure of separate crystals develops an electrical signal in such a way that the second harmonic distortions from the portions cancel.

BACKGROUND OF THE INVENTION

Piezoelectric transducers for a variety of applications, including hydrophones, are well known. Piezoelectric devices respond to an application of stress, such as externally applied pressure as from a sound signal, to develop an electrical potential. Conversely, piezoelectric devices develop a mechanical response when a voltage is applied. The behavior and characteristics of piezoelectric materials is well described in IEEE Standard on Piezoelectricity, 1978, incorporated herein by reference.

The earliest such applications for transducers were entirely analog. With the advent of digital technology, however, digital techniques were soon applied to signal detection and processing. This digital technology, in general, is capable of higher resolution than the previous analog techniques.

The earliest digital signal acquisition and processing data rates were extremely slow, and had fewer bits per sample, compared with the state of the art today. With slow bit rates, distortion produced by the piezoelectric crystals was relatively insignificant. In this context, the term "distortion" refers to the increasing significance of harmonics, particularly the second harmonic, compared to the fundamental of the signal, with increasing signal output.

As stress on a piezoelectric device increases, the amplitudes of the harmonics produced by the crystal increase at a rate that is faster than the rate of increase in the amplitude of the fundamental. Furthermore, as digital signal processing has increased in speed and resolution, the distortion of the signal from the harmonics has become more and more important. The clarity and resolution is thus dependent more and more on the signal from the transducer being relatively undistorted.

In certain applications such as seismic applications, noise from the background and other sources is of much higher amplitude than the return signal of interest. A variety of techniques, such as correlation, have been developed to extract the reflected, desired signal from this background noise. The non-linearity in the signal from the crystal will cause inter-modulation between the background noise and the desired signal. In other words, the desired signal will be amplitude modulated by the much larger noise signal, generating new families of modulation products, complicating the filtering process.

Equipment improvements in data rate, resolution, and linearity bring better definition in resultant profiles, to the point that non-linearity and distortion from the transducer contribute most of the signal error. That means that an improvement in the accuracy of the transducer brings an immediate improvement in signal quality.

A further difficulty lies in the fact that, since there is no perfect transducer, there is no standard against which to measure the distortion from a transducer. This is illustrated in FIG. 10, page 36, in the previously mentioned IEEE Standard on Piezoelectricity.

Thus, there remains a need for a method and system to eliminate or at least minimize the effects of signal distortion from the active element in a transducer, such as a piezoelectric device. Such a method and system should eliminate the distortion effects of the piezoelectric device, despite the non-linearity of the element itself. The system should be self-contained and not have to rely on any other signal processing steps or other active elements such as transistors.

A viable solution to these and other problems was disclosed in application Ser. No. 08/452,386 entitled Low Distortion Hydrophone, now U.S. Pat. No. 5,541,894. In this disclosure, a first piezoelectric element is mounted so as to receive a pressure signal. A second piezoelectric element is provided with a means of receiving and enhancing the same pressure signal. Since a piezoelectric element is a capacitor, another capacitor is coupled in parallel with the second element to serve as a divider. The output voltage of the combination of the two elements is taken as the difference between the positive terminals of the two elements. Thus, the effect of the pressure enhancer and capacitance divider is to provide a difference in potential between the fundamentals from the two elements, while rendering the amplitude of the second harmonics equal. The two equal second harmonics cancel each other out at the output terminals, at at least one pressure, while retaining a useful fundamental for further signal processing.

This improved hydrophone presents at least two drawbacks. First, it calls for distinct capacitive elements in addition to the piezoelectric crystal. Further, it calls for separate structure to enhance the pressure signal on a piezoelectric element. Thus, there remains a need for a hydrophone structure that eliminates the need for such separate elements.

It has also been found that the electrical signal attributable from various regions of a piezoelectric crystal varies according to the degree of stress impressed upon that region of the crystal. The recognition of this phenomenon should provide an opportunity to combine signals from different regions of the crystal to reduce distortion of the signal from higher order harmonics. This feature has been developed in co-pending application Ser. No. 08/545,342, entitled Segmentation and Polarization in a Hydrophone Crystal, incorporated herein by reference.

In U.S. Pat. No. 5,663,931, piezoelectric crystal segments are mounted upon a backing plate. The crystal segments are mounted with alternating polarity, with end segments of the opposite polarity from the center segment. The pressure sound signal that is impressed upon the crystal segments causes the segments to flex, and thus be stressed, in the same direction, creating electrical signals in opposite directions, depending upon the polarity of the segment.

It has been found that, if the center portion of the crystal could be flexed in a direction opposite to that of the end portions, the various regions of the crystal develop electrical responses to a sound pressure signal of opposite polarity. The second harmonic from the center portion of the crystal subtracts from the second harmonic from the end portions.

The portions of the crystal may be segmented to tailor the areas to be stressed in selected directions. Alternatively, the crystal element may simply be mounted to a conductive support member. This feature offers significant simplification and cost savings in the manufacture of such a hydrophone element. This is disclosed in U.S. Pat. No. 5,677,894 entitled Hydrophone Structure With Center Pin, filed Dec. 27, 1995, of which the present disclosure is a continuation-in-part. The disclosure of U.S. Pat. No. 5,677,894 is incorporated herein by reference. In U.S. Pat. No. 5,677,894, the flexure of the various portions of the crystal in opposite directions is accomplished by a center pin in between parallel plates holding crystal elements. Since the filing of U.S. Pat. No. 5,677,894, it has been found that this flexure may be effectively accomplished using a wide variety of structures and methods. This is the focus of the present disclosure.

The present invention also recognizes that a piezoelectric crystal element exhibits point characteristics. That is, one point on the crystal exhibits a different response to a macroscopic stress than the point immediately adjacent to it, since the stress imposed on the crystal is a smoothly varying function. Thus, another feature of the present invention recognizes the need for minimizing, or at least controlling the imposition of undesired flexure on the crystal. For example, it has been found that a large solder connection to the crystal imposes an undesired variation from the anticipated stress profile across the crystal. Thus, there remains a need for a hydrophone crystal and a method of making the hydrophone which takes into account this undesired variation from the expected stress flux density, such as by minimizing the solder pool necessary to make a sound mechanical and electrical coupling between the piezoelectric crystal and an electrical lead.

SUMMARY OF THE INVENTION

The present invention employs a piezoelectric hydrophone crystal mounted to a backing plate. One region of the crystal is constrained to flex in one direction in the presence of a pressure signal while another portion of the crystal is constrained to flex in the opposite direction under the same pressure (sound) signal. Alternatively, separate crystal elements mounted to a common backing plate are similarly constrained.

For example, in the presence of a downward pressure, the end portions develop a first directional flexure and another portion, due to structural constraints, develops a second directional flexure. With this reverse flexing phenomenon, the various portions of the crystal develop electrical signals of opposite polarity.

The piezoelectric crystal element may also be scored into segments of selected areas. By carefully selecting the areas of the end segments, and electrically coupling the segments so that the harmonics of the various segments are added out of phase, the distortion introduced by the harmonics of the various phases subtract. The relative strengths of the signals from the segments may be tailored by adjusting the areas of the segments.

The present invention thus provides a new hydrophone element and structure, as well as a method of making the hydrophone structure. The present invention significantly simplifies the previously disclosed structure to reduce the cost of manufacture of the hydrophone structure. The present invention, in recognizing the point characteristics of the hydrophone element, also eliminates or at least reduces the effects of undesired flexure in the crystal caused by the connection of the lead to the crystal.

These and other features of the present invention will be readily apparent to those of skill in the art from a review of the following detailed description along with the accompanying drawings.

DETAILED DESCRIPTION OF A PREFERRED EMBODIMENT

Figure 1:
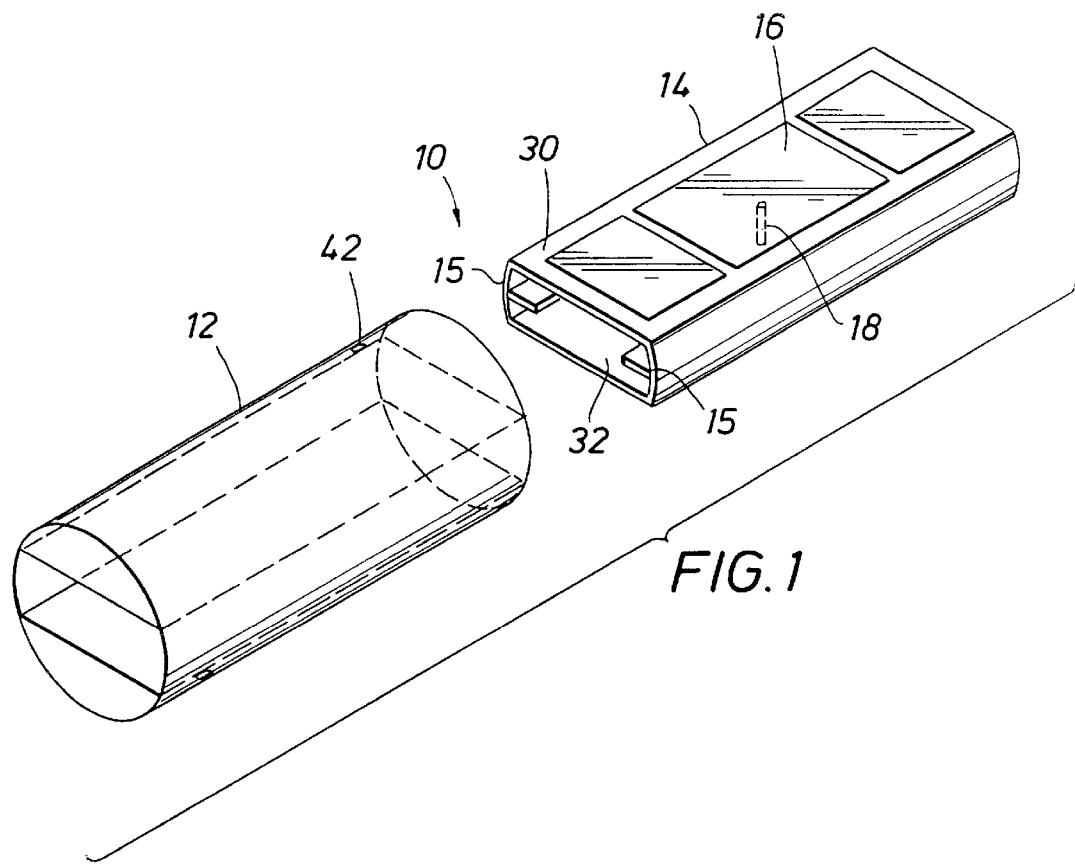
FIG. 1 is a perspective view of a hydrophone casing and mounting structure to which a hydrophone transducer may be mounted to create a reverse flexure and also showing the placement of a hydrophone crystal on the mounting structure.

Referring first to FIG. 1, a presently preferred hydrophone structure 10 for enclosing and supporting the present invention is depicted. Those of skill in the art will recognize that many supporting structures for hydrophone elements are possible and fully within the scope of the present invention.

The structure 10 comprises primarily a casing 12 and a support element 14, which holds a piezoelectric crystal element 16 of the hydrophone. The support element 14 is configured to fit within the casing 12 and to support the crystal element 16. Such a piezoelectric crystal element may be acquired from EDO in Salt Lake City, Utah. The support element 14 comprises an upper wall 30, a lower wall 32, each connected together and set apart from one another by a set of side walls 15.

Figure 2:
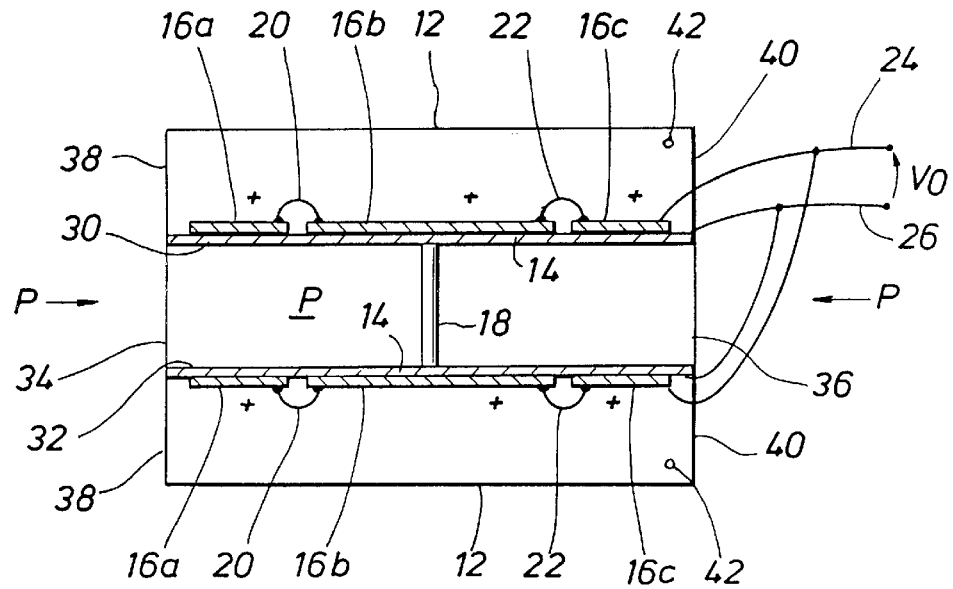
FIG. 2 is a section view of a hydrophone mounting structure adapted to receive the hydrophone element to create a reverse flexure.

The piezoelectric element 16 is placed on the support element 14, which comprises a conductive substrate, preferably by mounting the crystal on the support structure with a conductive epoxy. The element 16 may then be etched to separate the element into at least two and preferably three segments 16a, 16b, and 16c, as shown in FIG. 2. Alternatively, the element 16 may be mounted to the support structure as a single segment.

The segment 16a may be referred to herein as a first end segment. The segment 16b may be referred to as the mid segment and segment 16c may be referred to as a second end segment. It should be recognized that these segments comprise the respective regions of the crystal if the crystal is not segmented.

The crystal element, or each of the segments, is polarized in a predetermined direction by the application of a polarizing voltage, for example $300V_{DC}$. It is known that the application of such a voltage for a sufficient period of time will polarize a piezoelectric material indefinitely. The polarized segments are then individually coupled to outputs to provide an output signal in which the signals from the various segments or portions of the crystal add electrically.

In the embodiment of FIGS. 1 and 2, centered beneath the support structure 14, and thus the element 16, is a center pin 18. The pin 18 may be formed of a substantially rigid post or plate oriented across the axis of the element 16. If a pressure signal is impressed upon the element from the top, then the end segments experience concave flexure and the center portion experiences convex flexure, due to the presence of the center pin 18. If, as in the presently preferred embodiment, the pressure signal is introduced within the support structure 14, then the directions of the flexure of the various portions or segments is reversed. Thus, the center pin is rigidly secured to the underside of the support element 14.

It has also been recognized that the signals produced by the end and center segments or portions are of opposite polarity from those of the mid segment. This is because the end segments experience flexure in a direction opposite to that of the center segment or portion. If the segments are coupled together as shown in FIG. 2, and the areas of the various segments are carefully controlled so that the second harmonic tends to cancel, significantly reduced distortion results.

It should be appreciated that, in the center segment, the second harmonic is relatively greater than in the end segments. Thus, while the second harmonics from the center segment tends to cancel out the second harmonic from the end segments, the fundamental from the center segment is relatively less significant and does not cancel out the fundamental from the end segments.

FIG. 2 depicts a preferred embodiment for the arrangement of the crystal segments. In FIG. 2, the thickness of the crystal element and the etched gaps between the segments are exaggerated for ease of illustration. The segments are coupled by jumpers 20 and 22. One terminal 24 of the transducer is taken from the upper surface of the crystal and the other terminal 26 is taken from the conductive substrate 14. The substrate 14 may also be mounted to and insulated from a separate diaphragm element in a manner known in the art.

As shown in FIG. 2, it is preferred that the pressure signal is conducted within the support structure. The support structure defines an upper wall 30, on which is mounted a set of crystal segments, and a lower wall 32, on which is mounted another set of crystal segments. The segments are then electrically coupled as illustrated in FIG. 2. The sound pressure signal is conducted from outside the hydrophone through openings 34 and 36, into the interior of the hydrophone. When the hydrophone is assembled as shown in FIG. 1, the support structure 14 is preferably sealed to the casing 12 by end-plates 38 and 40. The volume between the casing 12 and the support structure 14 may then be (almost) filled with a fluid, such as oil. To accommodate the sound signal and permit the piezoelectric elements to flex, a small air bubble 42 acts as a cushion. If there is no fluid communication between the chambers above and below the support structure, another bubble 42 acts a cushion to permit flexing of the crystal segments on the underside of the support structure.

It should also be understood that the present invention is equally applicable to a structure in which the piezoelectric crystal is mounted to an electrode which is electrically insulated from the support structure. The advantage of such an arrangement is that a short circuit to the support structure remains insulated from the crystal and its mounting electrode.

Figure 3:
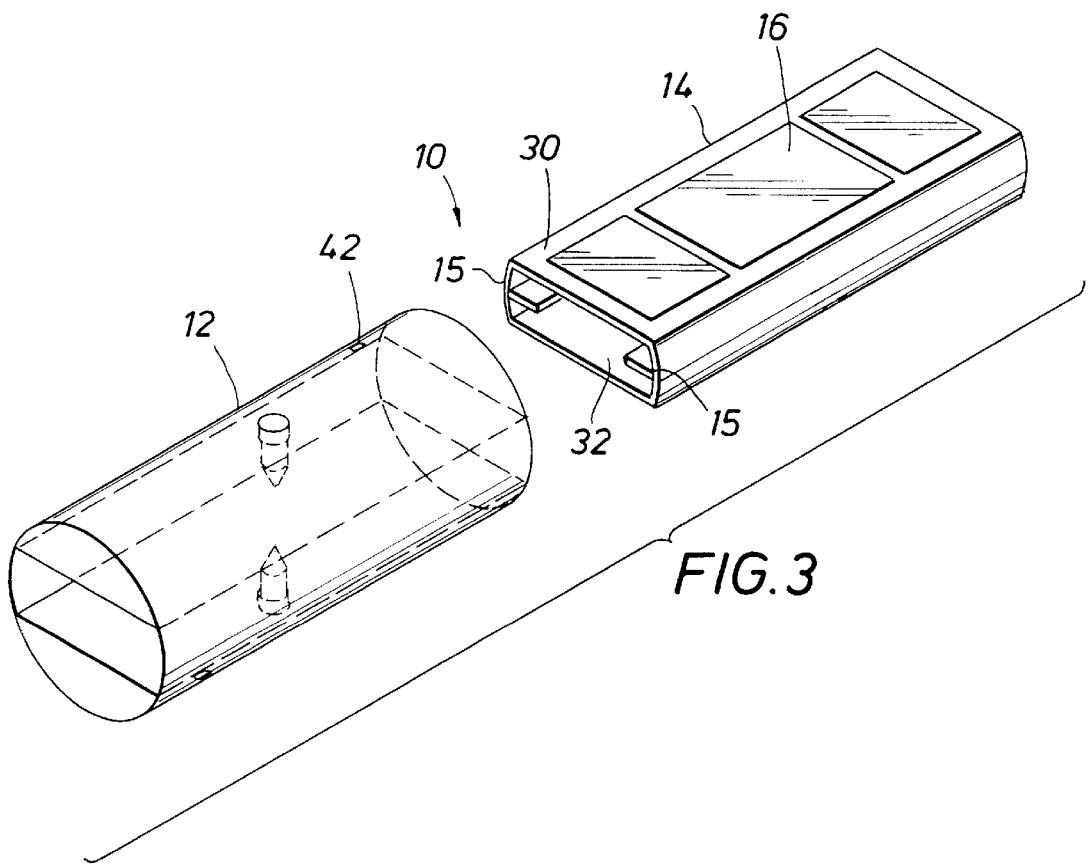
FIG. 3 is a perspective view of a hydrophone casing and mounting structure to which a hydrophone transducer may be mounted, also to create a reverse flexure, and also showing the placement of a hydrophone crystal on the mounting structure
Figure 4:
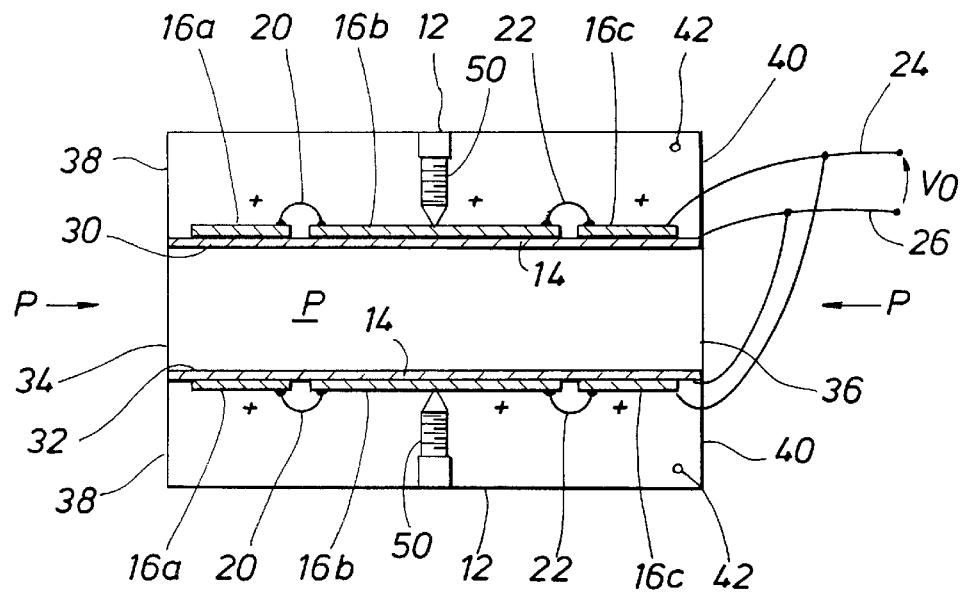
FIG. 4 is a section view of a hydrophone mounting structure adapted to receive the hydrophone element to also create a reverse flexure.

FIGS. 3 and 4 illustrate an alternative embodiment for a hydrophone structure of the present invention. As before, the crystal may or may not be segmented. However, the center segment or portion in this embodiment is abutted by a support 50. The support 50 is preferably a slightly flexible roughly cone-shaped support to remain in contact with the mid segment 16b in all conditions of sound signals. The support is preferably not joined to the mid segment 16b, but is held in abutting contact through a spring-like action of the support 50.

This preferred embodiment offers a significant improvement in the ease of manufacture of the hydrophone structure. Before the support structure 14 and crystal element 16 are inserted into the casing 12, the support 50 is installed on the top and bottom inside surfaces of the casing. It has been found that this procedure is much quicker, less tedious, and more precise than welding or soldering a center pin 18 in place as shown in FIGS. 1 and 2. Also, the inside of the support 50 should be completely or at least partially filled with air to permit the support to track the vibration of the support 14 and installed mid segment 16b.

Figure 5A:
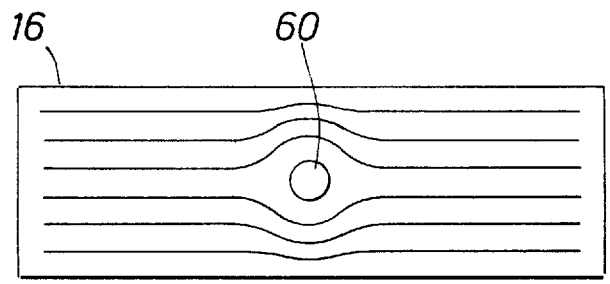
FIGS. 5A and 5B are plan views of a hydrophone crystal to demonstrate the effects of a solder connection on the lines of stress imposed upon a crystal element.
Figure 5B:
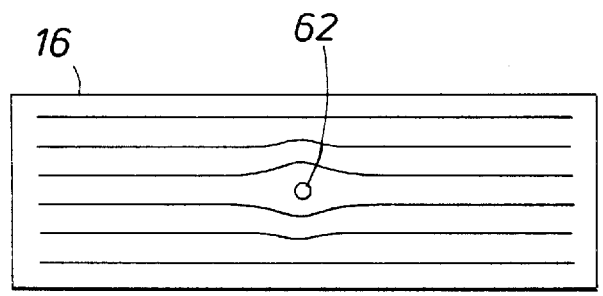

Each of the embodiments of FIGS. 1 through 4, inclusive, have resulted in a recognition that they exploit a phenomenon of point characteristics of a piezoelectric crystal. This discovery has also lead to the recognition that other elements of the hydrophone structure as a whole may be effecting the stress flux density at points in the crystal. For example, it has been recognized that a solder connection, like those shown in FIGS. 2 and 4, may adversely effect the stress flux density near the solder connection to a crystal 16. This phenomenon is illustrated graphically in FIGS. 5A and 5B. Figure 5A shows the effect on the stress flux in the presence of a sound signal for a large solder connection 60. Conversely, the aberrant effect on the stress flux density is reduced if the size of a solder connection 62 in minimized, as shown in FIG. 5B. This feature of the present invention has made point characteristics of the hydrophone crystal more predictable, and the flux shape within the crystal can now be tailored, as by the center pin 18 or the support 50, and eliminating the aberrant effects of the large solder connection 60.

Figure 6:
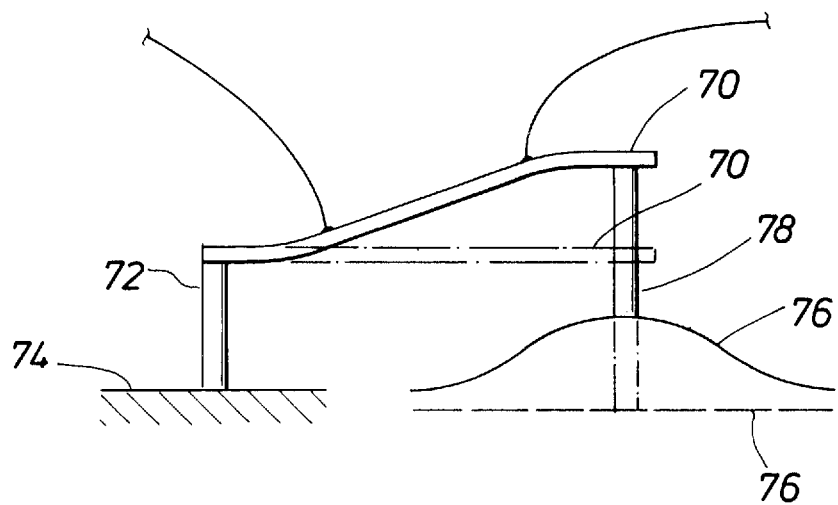
FIG. 6 is another structure to create reverse flexure, in this case using a cantilevered structure with an immovable mounting on one end with the other end coupled to a hydrophone diaphragm.

Finally, FIG. 6 depicts another structure to carry out the present invention. In this case, the a hydrophone crystal and backing 70 are cantilevered at a pedestal 72, which is mounted on a support 74. The hydrophone and backing 70 shown in phantom is the structure in the un-flexed condition, and the hydrophone and backing 70 is solid lines is in the flexed condition. The hydrophone and backing 70 is joined to a diaphragm 76 by a rigid coupling 78, which transfers the vibration of the diaphragm to the crystal. Note that the curvature of each of the elements is exaggerated in FIG. 6 for ease of depiction. In each case, the flexure of the crystal and backing 70 is constrained by the juncture at the pedestal 72 and at the coupling 78, thereby creating regions of reverse flexure to take advantage of the present invention.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A hydrophone transducer element comprising:
   a. a piezoelectric crystal defining first and second end portions and a center portion;
   b. a first support structure including an enclosure and further including a wall on which the crystal is mounted, the wall defining first and second ends, the first and second ends being rigidly mounted to the enclosure; and c. a second support structure adjacent the center portion of the crystal to constrain the bending movement of the center portion of the crystal.

2. The transducer element of claim 1, wherein each of the first end portion, the second end portion, and center portion defines a segment of the crystal.

3. The transducer element of claim 1, wherein the wall is electrically conductive.

4. The transducer element of claim 1 wherein the second support structure comprises a flexible member in abutting contact with the crystal.

5. A hydrophone comprising:

a. an axially oriented, elongate casing;

b. an electrically conductive supporting wall within the casing, the wall defining a sound conductive channel through the support element and rigidly mounted to the casing;

c. a piezoelectric crystal on the wall outside the channel, the crystal defining a first surface in contact with the wall and a second surface opposite wall;

d. a first output terminal of the transducer electrically coupled to the wall;

e. a second output terminal of the transducer electrically coupled to the second surface ; and f. a flexible member in abutting contact with the crystal to constrain the bending movement of a portion of the crystal.

6. The hydrophone of claim 5, wherein the second output terminal of the transducer is electrically coupled to the second surface with the minimum amount of solder needed to ensure secure electrical and mechanical coupling of the second output terminal to the second surface.

7. The hydrophone of claim 5, wherein the casing and the wall define a volume therebetween.

8. The hydrophone of claim 7, wherein the volume is substantially filled with a fluid, except for an air bubble.

9. The hydrophone of claim 5, wherein the wall defines an upper wall and further comprising an opposed lower wall and opposed side walls between the upper and lower walls, the upper, lower, and side walls defining a substantially rectangular cross section.

10. The hydrophone of claim 9, wherein the crystal is mounted on the upper wall.

11. The hydrophone of claim 10, further comprising:

a. a second crystal mounted on the lower wall outside the channel, the second crystal defining a third surface in contact with the lower wall and a fourth surface opposite the support element;

b. wherein the third surface is electrically coupled to the first output terminal; and c. wherein the fourth surface is electrically coupled to the second output terminal.

12. The hydrophone of claim 5 further comprising an opening to conduct a sound signal into the channel.

13. The hydrophone of claim 5 wherein the flexible member is between the crystal and the casing.

14. A method of forming a hydrophone element comprising the steps of:

a. mounting an elongate piezoelectric element to an electrically conductive support element;

b. attaching a flexible bending-motion limiter to inside surface of an axially oriented, elongate casing;

c. placing the support element with the piezoelectric element mounted thereon into the casing so that the motion limiter is in abutting contact with the piezoelectric element and the support element is rigidly mounted to the casing;

d. coupling the piezoelectric element to a first output terminal; and e. coupling the support element to a second output terminal.

* * * * *